March 2, 1971  G. E. W. LEWIN  3,566,433

CASTER WHEEL ARRANGEMENT WITH DAMPING DEVICE

Original Filed Nov. 20, 1967 ically retained by a holder securely mounted on an object. The mounting plate 1 as shown in FIG. 1 has a relatively large central opening 49 into which the wheel fork 43 is inserted from above. The upper portion of the wheel fork is cylindrical and has an outwardly extending flange 4 about its upper edge, which flange has a diameter greater than the diameter of the opening 49 so as to provide with the surrounding edge 9 of the opening 49 a race for ball bearings 40. A second race for ball bearings 41 above the flange 4 may be provided, as shown, by employing a thrust plate 10.

United States Patent Office 3,566,433
Patented Mar. 2, 1971

3,566,433
CASTER WHEEL ARRANGEMENT WITH DAMPING DEVICE
Gunnar Erik Werner Lewin, Viggbyholm, Sweden, assignor to AB Lyckeaborgs Bruk, Torskors, Sweden
Original application Nov. 20, 1967, Ser. No. 684,160. Divided and this application June 2, 1969, Ser. No. 829,284
Claims priority, application Sweden, Dec. 2, 1966, 16,521/66; June 2, 1967, 7,736/67; June 30, 1967, 9,906/67
Int. Cl. A47b 91/00
U.S. Cl. 16—44         1 Claim

ABSTRACT OF THE DISCLOSURE

A caster wheel arrangement is provided with means for damping shocks and jars when obstacles are encountered by the caster wheel whereby the structure of the caster wheel arrangement as well as the load carried thereby is protected from damage.

---

This application is a divisional of my application, Ser. No. 684,160, filed Nov. 20, 1967.

According to the present invention a damping device is provided for a caster wheel arrangement, in which the wheel fork has no rivet but a large open central space.

It was found in practice that the wheel axis and other elements in a caster wheel arrangement can be easily damaged by hard and sudden bumps against the wheel, for example when the wheel under heavy load collides with an obstacle. For reducing the damaging effect of such impacts, attempts have been made to damp the impacts by making the caster wheel to some extent resilient. According to conventional constructions, tension springs or compression springs have been employed which by means of projecting links damp the effect of an impact against the wheel. None of these constructions, however, has proved successful. The reason is primarily found in the difficulty of building the springs into the construction without making it clumsy and difficult to handle. Moreover, the conventional constructions are very expensive and have been used only to a very limited extent.

This invention has as its object to eliminate the shortcomings of the conventional damper constructions for caster wheels and substantially to improve the damping effect of sudden shocks.

The caster wheel arrangement comprises a holder rigidly mounted on an object, which holder is adapted to detachably retain a mounting plate having a large central hole, in which hole a wheel fork with an outwardly bent upper flange of a diameter exceeding that of the central hole can be inserted from above and via bearing means to rest against the surface of the plate surrounding the central hole, as described in my application 684,160. The wheel fork of the present invention substantially comprises two parts, an upper forked part rotatably mounted in the mounting plate, and a lower L-shaped part, supporting the wheel, pivotally mounted in the upper forked part on a horizontal axis, the damping device being mounted in the forked part for damping the movements of the wheel caused by shocks.

Figure 1:
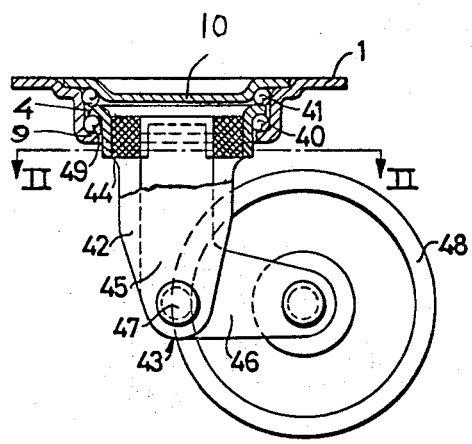
FIG. 1 shows a side-view, partially in cross-section, of a caster wheel arrangement with a damping device according to the invention.

The caster wheel arrangement, as described in my copending application 684,160 filed Nov. 20, 1967 includes a mounting plate 1 which is detachably and slidably retained by a holder securely mounted on an object. The mounting plate 1 as shown in FIG. 1 has a relatively large central opening 49 into which the wheel fork 43 is inserted from above. The upper portion of the wheel fork is cylindrical and has an outwardly extending flange 4 about its upper edge, which flange has a diameter greater than the diameter of the opening 49 so as to provide with the surrounding edge 9 of the opening 49 a race for ball bearings 40. A second race for ball bearings 41 above the flange 4 may be provided, as shown, by employing a thrust plate 10.

As shown in the figures, the invention substantially comprises a mounting plate 1 which is provided with a large central hole 49 having a horizontal edge portion, and a wheel fork 43 which via ball bearings 40 and 41 is rotatably mounted within the central hole 49 of the mounting plate. The wheel fork 43 comprises two parts, an upper forked part 42 having an upper substantially cylindrical shape which is rotatably mounted in the mounting plate 1, and a lower L-shaped part, 45, 46, which is pivotally mounted in the upper part by a pivotal axis 47 which is mounted horizontally in the lower portion of said forked part and may comprise two axle journals as seen in FIG. 2.

The L-shaped part 45, 46 is shaped as an angular lever with a substantial right angle, so that one lever 45 of rectangular cross section extends from the pivotal axis 47 vertically upwardly into the upper cylindrical part 42, and the other lever 46 which carries a caster wheel 48 extends horizontally outwardly from the pivotal axis 47.

Figure 2:
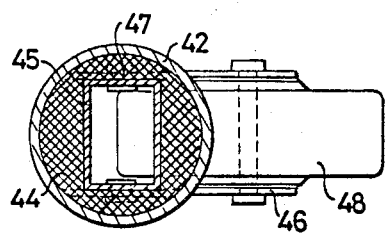
FIG. 2 shows a horizontal cross-section through the arrangement according to FIG. 1 along the line II—II thereof.

According to FIG. 1 the damping device 44 comprises resilient damping members, for example in the form of compression springs (not shown) or blocks of elastic material, mounted on opposed sides of the upper end of the rectangular vertical part 45 of the wheel fork as shown in FIGS. 1 and 2 so as to resiliently restrict movement of upper part 42 about axis 47.

According to the embodiment shown in FIG. 2, the damping device is an elastic mass which entirely surrounds the upper rectangular end of the vertical part 45 of the wheel fork.

When compression springs are used, the springs are disposed on opposed sides of part 45 so that their axes extend transversely of the axis of pivotal axis 47 thus restraining movement of the wheel fork 45, 46 about the axis 47.

According to a further embodiment (not shown), the entire upper rectangular part 45 of the wheel fork may be embedded in an elastic mass which also fills the central opening in part 45.

When the last mentioned embodiment is employed, metallic sounds which possibly may arise due to metal-metal contact, for example in the bearings or in other place, are eliminated and the caster wheel runs entirely noiselessly, while at the same time providing a good damping effect in all directions.

What distinguishes the present invention essentially over conventional damping constructions is, that the damping can be effected within the caster wheel arrangement, due to the construction of the latter.

It is obvious that the invention is not restricted to the embodiments described and shown, but can be utilized in other ways within the scope of the claims.

I claim:

1. A damping device for a caster wheel arrangement comprising a non-rotatable mounting plate detachably mountable on an object, a wheel fork including a forked part and an upper cylindrical part defining a hollow space therein and mounted on said mounting plate to rotate about a vertical axis, an L-shaped part pivotally mounted within said forked part about a horizontal axis, the upwardly extending arm of said L-shaped part extending upwardly into the hollow space of said upper cylindrical part, a caster wheel mounted adjacent the outer end of the lower arm of said L-shaped part, and resilient damping means disposed circumferentially within said hollow space between the upper cylindrical part of said wheel fork and the upper portion of the upwardly extending arm of the L-shaped part of resilient damp movement of the L-shaped part about its horizontal axis when the caster wheel strikes an obstacle.

References Cited

UNITED STATES PATENTS

| | | | |
|---|---|---|---|
| 1,745,992 | 2/1930 | Herold | 16—44 |
| 2,647,277 | 1/1949 | Christensen | 16—44 |

FRANCIS K. ZUGEL, Primary Examiner

D. C. TROUTMAN, Assistant Examiner